United States Patent
Trinel et al.

(10) Patent No.: US 11,424,590 B2
(45) Date of Patent: Aug. 23, 2022

(54) MODERATELY MULTIMODAL AMPLIFYING FIBRE

(71) Applicants: CENTRE NATIONAL DE LA RECHERCHE SCIENTIFIQUE, Paris (FR); UNIVERSITE DE LILLE, Villeneuve d'Ascq (FR)

(72) Inventors: Jean-Baptiste Trinel, Loison Sous Lens (FR); Guillaume Le Cocq, Lambersart (FR); Laurent Bigot, Hellemmes-Lille (FR); Géraud Bouwmans, Cysoing (FR)

(73) Assignees: CENTRE NATIONAL DE LA RECHERCHE SCIENTIFIQUE, Paris (FR); UNIVERSITE DE LILLE, Villeneuve d'Ascq (FR)

( * ) Notice: Subject to any disclaimer, the term of this patent is extended or adjusted under 35 U.S.C. 154(b) by 324 days.

(21) Appl. No.: 16/628,424

(22) PCT Filed: Jun. 29, 2018

(86) PCT No.: PCT/EP2018/067543
§ 371 (c)(1),
(2) Date: Jan. 3, 2020

(87) PCT Pub. No.: WO2019/007826
PCT Pub. Date: Jan. 10, 2019

(65) Prior Publication Data
US 2020/0313382 A1  Oct. 1, 2020

(30) Foreign Application Priority Data
Jul. 3, 2017 (FR) .................... 1756238

(51) Int. Cl.
*H01S 3/067* (2006.01)
*H01S 3/16* (2006.01)
*G02B 6/02* (2006.01)

(52) U.S. Cl.
CPC ...... *H01S 3/06729* (2013.01); *H01S 3/06754* (2013.01); *G02B 6/02338* (2013.01); *H01S 3/1603* (2013.01)

(58) Field of Classification Search
None
See application file for complete search history.

(56) References Cited

U.S. PATENT DOCUMENTS 8,891,917 B2 * 11/2014 Thomas ............... G02B 6/0208
385/29
9,250,385 B1 2/2016 Onaka
(Continued)

FOREIGN PATENT DOCUMENTS

EP 2852011 A2 3/2015
GB 2310506 A 8/1997

OTHER PUBLICATIONS

Le Cocq et al. "Few mode Er3+-doped fiber with micro-structured core for mode division multiplexing in the C-band." Optics Express vol. 21, No. 25, pp. 31646-31659 (Dec. 13, 2013). (Year: 2013).*
(Continued)

*Primary Examiner* — Eric L Bolda
(74) *Attorney, Agent, or Firm* — BakerHostetler (57) ABSTRACT

According to one aspect, a few-mode amplifying fiber in a given spectral band of use is provided. The few-mode amplifying fiber comprises a cladding having a given refractive index ($n_0$) and at least one core of refractive index and of dimensions suited to the propagation of a finite number of spatial modes in the spectral band of use of the fiber, a spatial propagation mode corresponding to a channel for transporting information. The core comprises a first solid material (Continued)

having a given first refractive index ($n_1$) strictly greater than the refractive index of the cladding ($n_0$), and, within said first material, inclusions spatially separated from one another, formed by longitudinal bars comprising a second solid material having a second refractive index ($n_2$) strictly greater than the first refractive index ($n_1$), at least one of said inclusions being actively doped.

12 Claims, 9 Drawing Sheets

(56) References Cited

U.S. PATENT DOCUMENTS

| | | | |
|---|---|---|---|
| 2002/0181911 A1* | 12/2002 | Wadsworth | C03B 37/0122 385/125 |
| 2006/0120677 A1* | 6/2006 | Broeng | G02B 6/02371 385/125 |
| 2011/0141555 A1 | 6/2011 | Fermann et al. | |
| 2014/0168756 A1 | 6/2014 | Zhu | |
| 2015/0077837 A1* | 3/2015 | Abedin | H01S 3/06716 359/341.5 |
| 2015/0369985 A1* | 12/2015 | Gruner-Nielsen | G02B 6/02314 359/15 |
| 2016/0020573 A1 | 1/2016 | Watanabe et al. | |

OTHER PUBLICATIONS

International Search Report and Written Opinion for Application No. PCT/EP2018/067543 dated Sep. 14, 2018 (20 pages).

* cited by examiner

MODERATELY MULTIMODAL AMPLIFYING FIBRE

CROSS-REFERENCE TO RELATED APPLICATIONS

The present application is a national phase entry of PCT/EP2018/067543, filed on Jun. 29, 2018, which claims the benefit of priority of French Patent Application No. 1756238, filed Jul. 3, 2017, the entire contents of which are hereby incorporated by reference in their entirety for all purposes.

TECHNICAL FIELD

The present invention relates to a few-mode amplifying fiber, a method for manufacturing such a few-mode amplifying fiber and an amplification module comprising such a few-mode amplifying fiber.

BACKGROUND

Performance in terms of information rate in single-mode optical fiber networks has incessantly increased over the last 30 years, notably for long-haul optical telecommunications applications. However, the exponential growth of data traffic currently being seen risks exhausting the available capacity for conveying data via the single-mode fibers. Indeed, when threshold optical powers are exceeded in the single-mode fibers, non-linear effects disrupt the form of the signals and prevent the bit rate from rising.

The multicore and/or few-mode fibers make it possible, through the recourse to the spatial multiplexing of the information to increase the transport capacity of a single optical fiber by a given factor. More specifically, a multicore fiber, or "MCF", comprises a plurality of single-mode cores within one and the same cladding. Each core can therefore be used as an independent channel for transmitting information: the transmission capacity of an MCF fiber is thus proportional to the number of cores that the fiber contains. A few-mode fiber, or "FMF", is a multimode fiber having a limited number of spatial propagation modes, typically between 2 and 100 spatial modes; such a few-mode fiber can make it possible to use the different spatial modes as that many channels for transporting information. Sufficient effective index differences between the modes limit the coupling between the modes (otherwise referred to as "crosstalk"), which makes it possible to use the groups of modes as that many independent transmission channels in one and the same fiber core. It is also possible to combine the two approaches, by using a multicore fiber, each core of which can guide a limited number of propagation in the same way as the FMFs.

For optical signals to be transported over long distances, the optical signals are re-amplified, after a given propagation distance, typically a hundred or so km. For this, it is known practice to use fiber amplifiers, for example erbium-doped fiber amplifiers. Thus on a network comprising N single-mode transport fibers, as many fiber amplifiers will be used.

The development of few-mode fiber amplifiers has been the subject of intense research for a few years, notably in the field of optical telecommunications, whether it be in order to amplify optical signals originating from a few-mode transmission fiber or else in order to amplify, using a single amplifying component, optical signals originating from a set of single-mode fibers. To achieve the desired performance level, works on the amplifying fiber and its use (pump modes used, in particular) are currently under way. One of the tracks consists in uniformly doping the core of a few-mode fiber. However, in this case, it is highly probable that an uncontrolled disparity will be obtained between the gains of the different modes, and, a fortiori, a disparity in the gains at the different wavelengths used for the transmission of the optical signals.

Because of this, works have been conducted with the aim of simultaneously and substantially identically amplifying all of the modes of the few-mode fiber over all of the telecom window (band C, in particular).

The article "*Latest results and future perspectives on Few-Mode Erbium Doped Fiber Amplifiers*", J-B. Trinel, G. Le Cocq, E. Andresen, Y. Quiquempois, and L. Bigot, Optical Fiber Technology, 35 56-63 (2017) describes the state of the art of these works as well as the methods implemented to achieve a balancing of the gains. Particularly described is the approach aiming to optimize the transverse distribution of the erbium dopant concentration to favor the equalization of the gain of four higher order spatial modes.

One of the methods presented in this article consists in depositing, on the inner wall of a deposition tube, layers of glass by modified chemical vapor deposition (MCVD). This method makes it possible to obtain an FMF with an erbium concentration which varies radially. However, the precise control of erbium concentration by this method is difficult and limited; moreover, the reproducibility of the fibers is not always assured.

Another method described in this article consists in assembling, in a fiber core, preforms having uniform concentrations of erbium with preforms without erbium, then drawing the assembly to obtain a fiber. Compared to the method previously described, this method has the advantage of offering a better control of the spatial distribution of erbium.

The present description proposes a few-mode amplifying fiber, which can be obtained with a controlled and reproducible manufacturing method and which allows for an even more precise control of the gain for each guided mode of the amplifying fiber.

SUMMARY

According to a first aspect, the present description relates to a few-mode amplifying fiber in a given spectral band of use, comprising a cladding having a given refractive index and at least one core of refractive index and of dimensions suited to the propagation of a finite number of spatial modes in the spectral band of use of the fiber, a spatial propagation mode corresponding to a channel for transporting information.

Said core comprises a first solid material having a given first refractive index strictly greater than the refractive index of the cladding, and, within said first material, inclusions spatially separated from one another, formed by longitudinal bars each comprising at least one second solid material having a second refractive index strictly greater than the first refractive index, at least one of said inclusions being actively doped.

"Propagation mode" or "guided mode" is understood in the present description to mean a solution of the Maxwell equations for the propagation of an electromagnetic field in the optical fiber. A guided mode is characterized by a transverse spatial distribution of the intensity of the electromagnetic field in the fiber, an orientation of the electrical/ magnetic fields (or polarization) and a propagation constant (proportional to the effective index of the mode).

Hereinafter in the description, reference will also be made to "spatial mode", which is characterized by the transverse spatial distribution of the intensity of the electromagnetic field in the optical fiber and to "group of spatial modes" which are spatial modes having one and the same propagation constant. Such an amplifying fiber has the advantage of allowing a better control of the gains of the spatial modes guided by the fiber and therefore of the amplification of the optical signals caused to be propagated in said fiber according to each of the propagation modes, while retaining the few-mode nature of the fiber. Indeed, the original, so-called "pedestal" structure of the core, obtained by virtue of a refractive index of the inclusions strictly greater than the index of the material at the periphery of the inclusions, which is itself strictly greater than the index of the cladding, allows for a control of the transverse intensity profiles of the guided spatial modes as well as a fine control of the gains through the selective application of doping within the inclusions. According to one or more exemplary embodiments, a normalized frequency parameter of each inclusion, defined by $$V_2 = \frac{\pi d_2}{\lambda}\sqrt{n_2^2 - n_1^2},$$

in which $n_1$ is said first refractive index, $n_2$ is said second refractive index, $d_2$ is a maximum dimension of said inclusion, is strictly less than 1, preferentially strictly less than 0.8. With a normalized frequency parameter of each inclusion that is sufficiently low, there is a guarantee of a transverse field of an optical wave being propagated in the few-mode amplifying fiber being confined in said first core but not within an inclusion. Thus, the inclusions do not individually guide the light. According to one or more exemplary embodiments, the difference between the second refractive index and the first refractive index is greater than or equal to $10^{-3}$. According to one or more exemplary embodiments, a maximum dimension of each inclusion is of the order of magnitude of the minimum wavelength of said spectral band of use, that is to say less than or equal to ten times the minimum wavelength of said spectral band of use. With inclusions of dimensions of the order of magnitude of the wavelength of the light signals intended to be propagated in the fiber, a light wave will not be confined in the inclusions, but "will see" a mean refractive index of the core. According to one or more exemplary embodiments, the inclusions are distributed symmetrically with respect to a central axis of the amplifying fiber. The symmetrical arrangement of the inclusions makes it possible in particular to adapt to the symmetry of rotation of the guided modes as they are known in the conventional optical fibers with circular core with which there is generally a desire for compatibility. On the other hand, a non-symmetrical arrangement with respect to a central axis of the amplifying fiber makes it possible to obtain intensity distributions that are less conventional but potentially advantageous for, for example, obtaining non-circular intensity distributions. According to one or more exemplary embodiments, at least one of said inclusions is doped with rare earth ions such as, for example, erbium ($Er^{3+}$), ytterbium ($Yb^+$), thulium ($Tm^{3+}$) ions. Depending on the cases, all the inclusions can be doped or not, with the same concentrations or not without the guiding properties being affected. The aim is to be able to very precisely form the transverse distribution of doping ions in the core by the discretization thereof. According to a second aspect, the present description relates to a method for manufacturing a few-mode amplifying fiber as claimed in the preceding claims comprising:

the assembly of millimetric peripheral longitudinal bars intended to form at least a part of the cladding of the amplifying fiber around millimetric central longitudinal bars intended to form the core of the amplifying fiber, said central longitudinal bars comprising:
a central longitudinal portion comprising said second material and
a peripheral longitudinal portion surrounding said central longitudinal portion and comprising said first material, the central longitudinal portion of at least one of the central longitudinal bars being actively doped;
the drawing of the duly formed assembly of said millimetric central longitudinal bars and of said millimetric peripheral longitudinal bars to form the amplifying fiber.

Such a method for manufacturing an amplifying fiber has the advantage of being technically controlled and reproducible. The realization of a micro-structured core obtained by assembly makes it possible to perfectly control the general geometry of the core. In particular, by virtue of the selective doping of the inclusions, the method thus described makes it possible to control the spatial distribution of the dopant; it is then possible to accurately produce the complex index profiles generated by the presence of dopants and to offer a very good predictability concerning the performance levels expected of the amplifying fiber.

According to one or more exemplary embodiments, the method for manufacturing an amplifying fiber comprises a preliminary step of manufacturing of said millimetric central longitudinal bars, said preliminary step comprising:
the production of preforms, for example by the MCVD method, the preforms comprising a silica shell, said first and second materials;
the machining of the preforms to partially or totally eliminate the silica shell;
the drawing of the preforms after machining to obtain said millimetric central longitudinal bars.

The manufacturing of the millimetric central longitudinal bars described above makes it possible, in a controlled manner, to control the index profile and include dopant ions if necessary in the second material to thereby form the doped inclusions of the amplifying fiber.

According to a third aspect, the present invention relates to an amplification module for optical signals of wavelengths lying within a given spectral band of use comprising:
a few-mode amplifying fiber according to the first aspect, configured to guiding of a given number of spatial modes in said spectral band of use;
an optical pumping source configured to emit a pump beam that makes it possible to activate the amplifying fiber;
a wavelength multiplexing component configured to inject said signal beams and said pump beam into the amplifying fiber.

Such an amplification module makes it possible to amplify, simultaneously and in a controlled manner, the optical signals adapted to be propagated according to the different spatial modes of the amplifying fiber, the optical signals being able to have different transmission wavelengths. Thus, the amplification function can be shared, for example by single-mode fiber networks, the weak coupling (obtained by an appropriate geometry) between the spatial modes and the control of the optical gain allowing for the propagation and the amplification of the optical signals coming from the single-mode fiber networks.

According to one or more exemplary embodiments, the amplification module comprises a pump beam spatial forming module configured to selectively control the activation of the amplifying fiber as a function of said spatial propagation modes.

According to one or more exemplary embodiments, the doping of at least one of said inclusions of the amplifying fiber and the spatial form of the pump beam are configured for the gains of the spatial modes to be equal.

According to one or more exemplary embodiments, the doping of at least one of said inclusions of the amplifying fiber and the spatial form of the pump beam are configured for the gain of a spatial mode of the amplifying fiber to be different from zero and for the gains of the other spatial modes to be nil.

BRIEF DESCRIPTION OF THE FIGURES

Other advantages and features of the invention will become apparent on reading the description, illustrated by the following figures which represent.

DETAILED DESCRIPTION

In the figures, the elements are not represented to scale for better visibility.

Figure 1A:
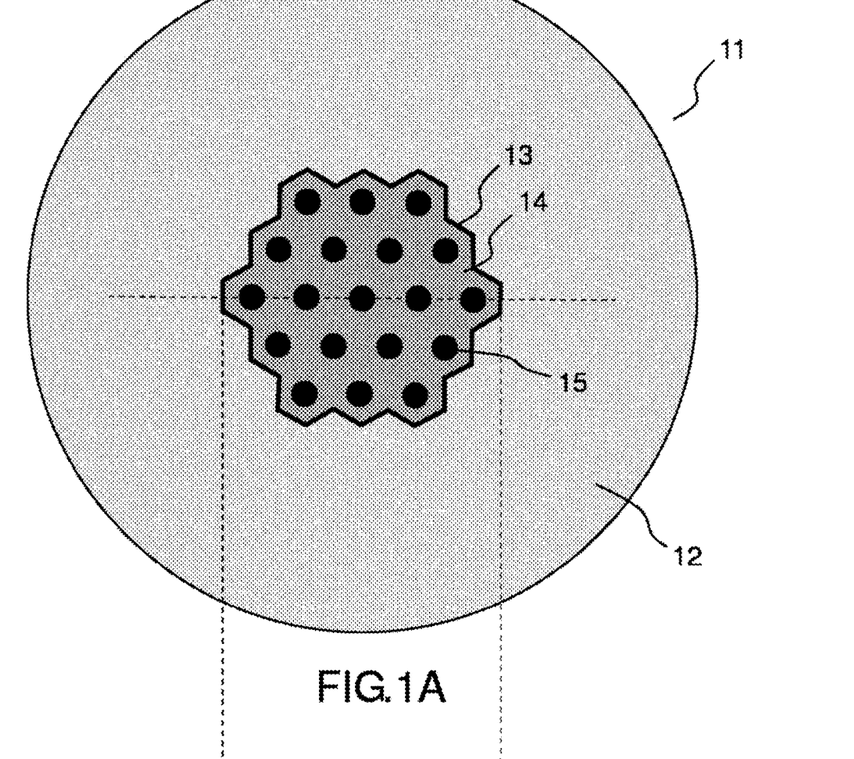
FIG. 1A, a diagram of an example of few-mode amplifying fiber according to the present description and FIG. 1B, the index profile of the core of the few-mode amplifying fiber represented in FIG. 1A.
Figure 1B:
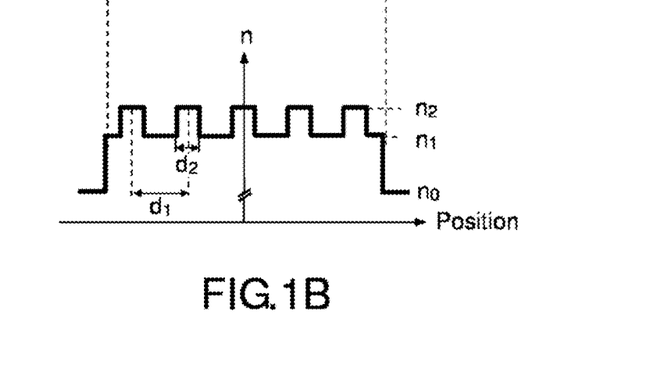

FIG. 1A schematically illustrates an example of few-mode amplifying fiber 11 according to the present description, adapted to operate in a given spectral band of use. FIG. 1B represents an example of index profile of the core of the fiber 11 illustrated in FIG. 1A, according to the dotted line represented in FIG. 1A.

The spectral band is, for example, the Telecom window covering the 1530-1565 nm range (called band C) in the case most commonly used of amplification by erbium ions, or even the 977-1100 nm range in the case of the ytterbium ions used for example for laser applications.

In this example, the few-mode amplifying fiber 11 comprises a cladding 12 having a given refractive index $n_0$ and a core 13 having an equivalent refractive index and dimensions suited to the propagation, in the spectral band of use of the fiber, of a finite number of spatial modes, typically between 2 and 100 spatial modes. The core 13 comprises a first solid material 14 having a given first refractive index $n_1$ strictly greater than $n_0$ and, within said first material, inclusions 15 spatially separated from one another and formed by longitudinal bars each comprising at least one second solid material having a second refractive index $n_2$ strictly greater than $n_1$.

According to an exemplary embodiment, the inclusions are formed by longitudinal bars comprising the second solid material. It is also possible for two distinct inclusions to be formed by longitudinal bars comprising one of the different materials, of different refractive indices.

According to the present description, at least one of said inclusions is actively doped, for example by means of erbium ions ($Er^{3+}$).

Generally, it is possible to define a maximum dimension $d_2$ of each of the inclusions 15 measured in a transverse cutting plane of the amplifying fiber 11 (plane of FIG. 1A), and a dimension $d_1$ between two adjacent inclusions defined for example by the distance between the centers of the two inclusions.

The parameters $n_0$, $n_1$, $n_2$, $d_1$ and $d_2$ are determined to obtain a sought given number of spatial modes in the spectral band of use of the fiber.

More specifically, to quantify the multimode nature of a fiber, it is possible, as is known, to define a "normalized core frequency", denoted $V_{core}$, and defined by:

$$Vcore = \frac{2\pi}{\lambda} \frac{A_{core}}{\sqrt{3\pi}} \sqrt{n_{PSM}^2 - n_0^2} \qquad (1)$$

in which $A_{core}$ is the total area of the core and $n_{FSM}$ is the equivalent index of the core, such that, assuming that the wavelength is greater than $d_2$:

$$n_{FSM} = \sqrt{n_1^2 + f(n_2^2 - n_1^2)} \qquad (2)$$

in which $$f = \frac{\text{Area\_of\_an\_inclusion}}{\text{Total\_area\_of\_a\_sub\_element\_of\_the\_family}} \qquad (3)$$

The total area of a subelement of the mesh corresponds to the area around an inclusion having a diameter $d_1$.

In the case of subelements with hexagonal section and of inclusions with circular section:

$$f = \frac{2\pi}{3\sqrt{3}} \left(\frac{d_2 \sqrt{3}}{2d_1}\right)^2 \qquad (4)$$

The parameters $n_0$, $n_1$, $n_2$, $d_1$ and $d_2$ are determined so that $V_{core}$ is sufficient great, that is to say strictly greater than 2.405, in order to allow the propagation of a plurality of guided modes in the core.

As illustrated in FIG. 1B, the transverse refractive index profile is a so-called "pedestal" index profile with $n_2 > n_1 > n_0$. Such a pedestal index profile associated with a maximum dimension $d_2$ of the inclusions smaller than or equal to the wavelengths of the spectral band of use, makes it possible to control the intensity of the spatial propagation modes while avoiding the containment of the electromagnetic field within the inclusions.

According to an exemplary embodiment, as is illustrated in FIGS. 1A and 1B, the inclusions have substantially identical forms and dimensions. In this example, the inclusions form substantially cylindrical bars, the dimension $d_2$ corresponding to a diameter of the bar and the dimension $d_1$ corresponding to the distance between two centers of said inclusions. Other forms are possible for the inclusions; for example, the inclusions can have an elliptical section.

Moreover, as is illustrated in FIGS. 1A and 1B, the arrangement of the inclusions can be symmetrical with respect to a central axis of rotation of the fiber. In this case, the intensity distributions for the guided modes can be similar to those encountered in the conventional optical fibers with circular core.

For each inclusion, it is also possible to define a normalized frequency parameter which makes it possible to evaluate the containment of the transverse field of an electromagnetic wave being propagated within the inclusion.

The normalized frequency of an inclusion is defined by:

$$V_2 = \frac{\pi d_2}{\lambda} \sqrt{n_2^2 - n_1^2} \quad (5)$$

A high value of the normalized frequency $V_2$ is characteristic of a strong containment of the field whereas a small value, typically smaller than 1, is characteristic of a weak containment of the transverse field of the electromagnetic wave in the inclusion. According to one or more exemplary embodiments, the parameters of the fiber will be chosen such that $V_2 < 1$, advantageously $V_2 < 0.8$, in order to prevent the containment of the light in an individual inclusion.

For example, with the combined action of the dimension $d_2$ of the inclusions (generally of the order of magnitude of or less than or equal to the wavelength of use) and of the coefficient $\sqrt{n_2^2 - n_1^2}$ makes it possible to limit the value of the normalized frequency and therefore the containment in the inclusions.

Figure 2:
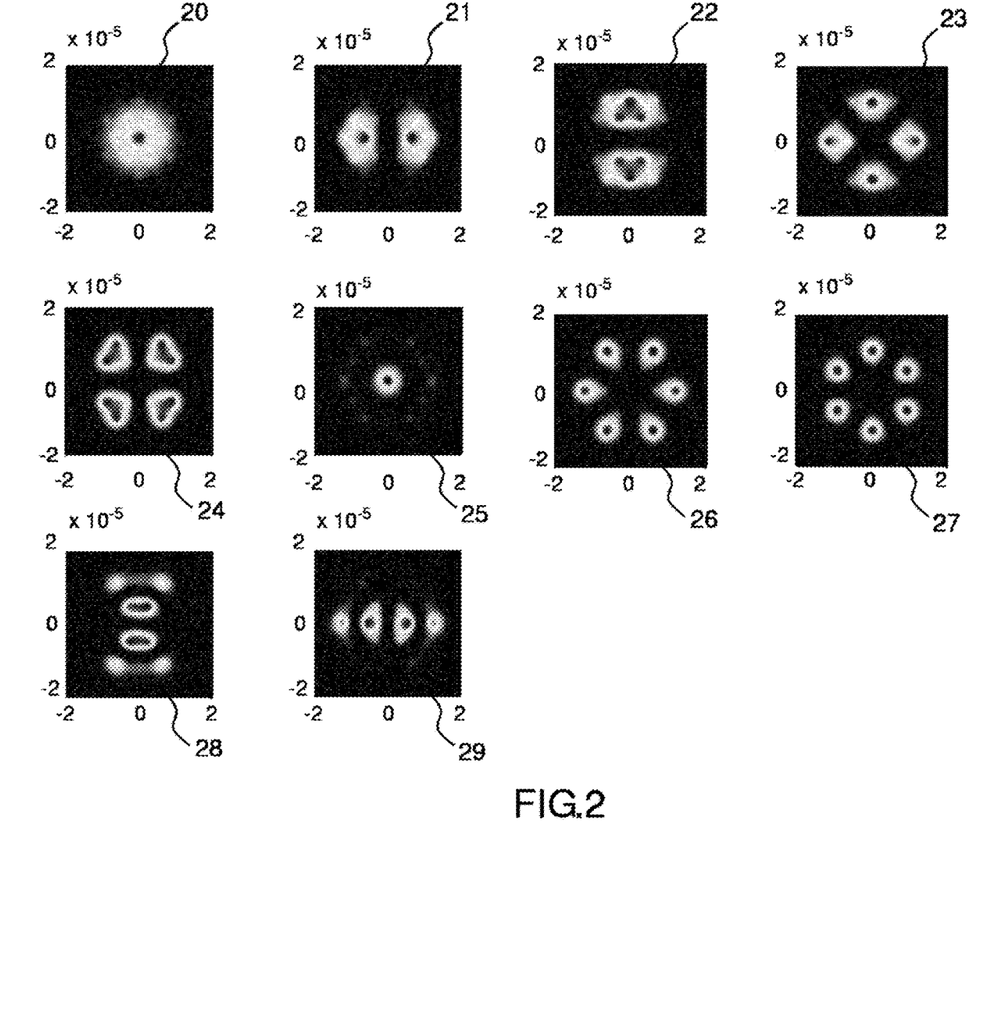
FIG. 2 a theoretical representation of different guided modes, at a wavelength lying within the spectral band of use of the fiber, in an example of few-mode amplifying fiber as illustrated in FIG. 1A.

FIG. 2 represents the intensity of the electromagnetic field calculated at a wavelength of 1550 nm for the first ten spatial modes guided in a few-mode amplifying fiber. More specifically, the images 20-29 correspond to the modes guided in the core of the fiber in descending order of the propagation constant (or in descending order of the effective index of the modes). The spatial modes are determined from the resolution of the Maxwell equations, for example by means of the Comsol MultiPhysics® software. As appears in FIG. 2, the 10 modes are not contained in the inclusions 5 (FIG. 1A) and are disturbed little by the inclusions. Indeed, in the spectral band of use, the material forming the core is configured to be sufficiently optically uniform; in other words, the electromagnetic wave which is propagated in the amplifying fiber 1 does not resolve the fine structure of the different materials that make up the core and the spatial modes are not contained in one or other of the inclusions and are disturbed little by the inclusions.

Figure 3A:
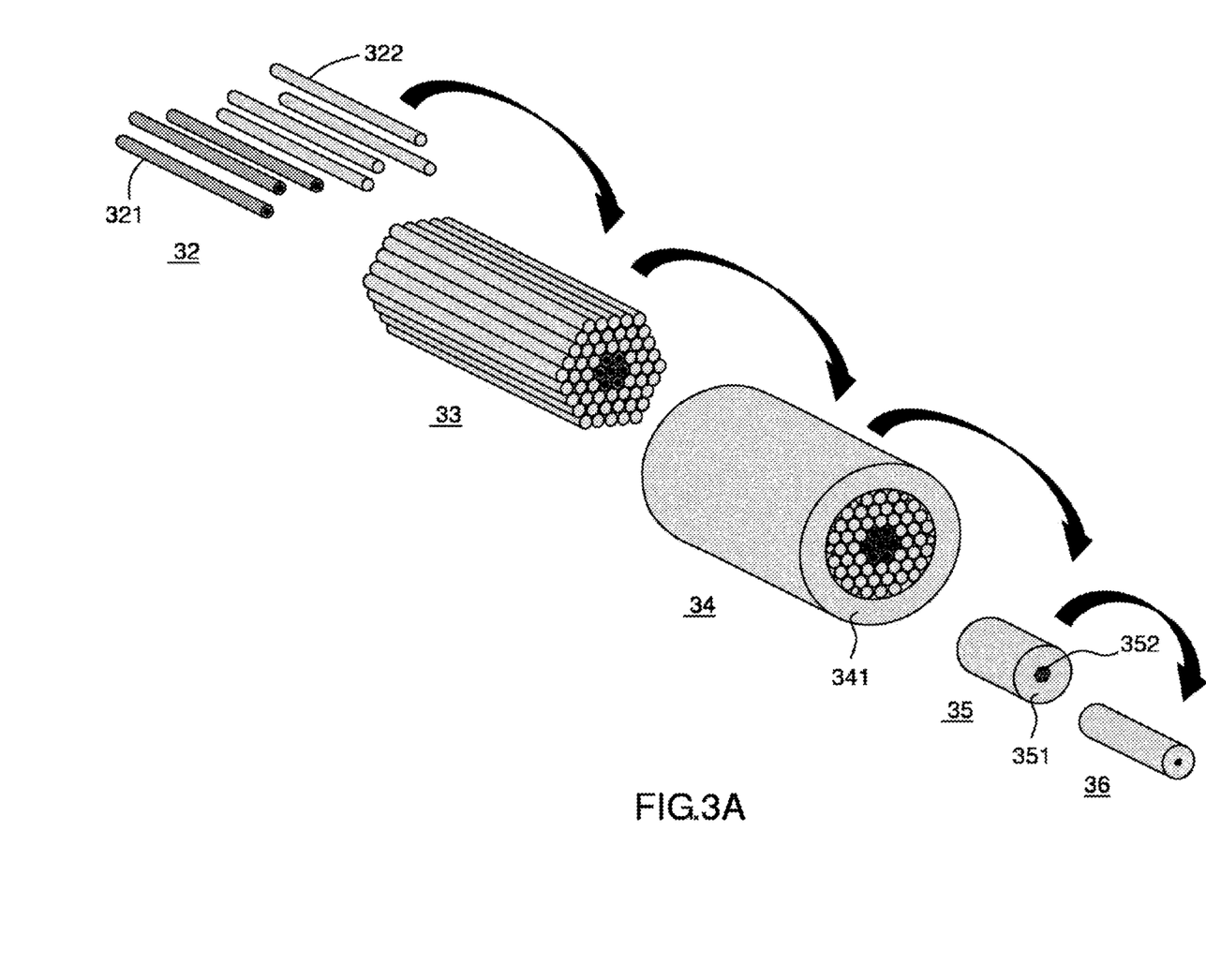
FIGS. 3A and 3B, diagrams representing steps in manufacturing an example of few-mode amplifying fiber according to the present description.

FIG. 3A illustrates different steps in the manufacturing of an example of few-mode amplifying fiber according to an example of manufacturing method according to the present description, called assembly-drawing.

In a first step 32, millimetric peripheral longitudinal bars 322 are gathered together that are intended to form the cladding of the amplifying fiber, the refractive index of which is $n_0$, and millimetric central longitudinal bars 321 are gathered together that are intended to form the core of the amplifying fiber. The millimetric bars are generally obtained from the drawing of centimetric cylinders.

The millimetric peripheral longitudinal bars 322 are for example bars of pure silica obtained from commercially available cylinders.

The central longitudinal bars 321 comprise a central longitudinal portion (shown dark in the figure) comprising the material of index $n_2$ and a peripheral longitudinal portion (shown light in the figure) surrounding the central longitudinal portion and comprising the material of index $n_1$. As will be detailed hereinbelow, the central longitudinal portion of at least one of the central longitudinal bars is actively doped, for example with erbium ions $Er^{3+}$.

The bars 321 and 322 are assembled in the form of a bundle (step 33), for example by simply depositing them one on top of the other, such that the peripheral longitudinal bars 322 are arranged for example hexagonally around the central longitudinal bars 321 that are intended to form the core of the amplifying fiber.

In a step 34, the bundle is inserted into a sleeve tube 341 then the assembly can be drawn a first time (step 35) so as to close the interstitial gaps present in the structure. A stick is then obtained that has a diameter of a few millimeters, the outer part 351 resulting from the drawing of the assembly formed by the sleeve 341 and the peripheral longitudinal bars 322 being intended to form the cladding and the inner part 352 resulting from the drawing of the assembly formed by the central longitudinal bars 321 being intended to form the core.

The stick that is thus obtained can be introduced into a second sleeve tube (not represented in the figure) and the assembly is drawn (step 36) to form the optical fiber, the diameter then being of the order of 80 μm to more than 1 mm depending on the applications.

The inclusions can be distributed symmetrically with respect to the central axis of the amplifying fiber during the step of production of the assembly.

Different manufacturing methods known to the person skilled in the art can be implemented for the production of the millimetric central longitudinal bars 321.

Figure 3B:
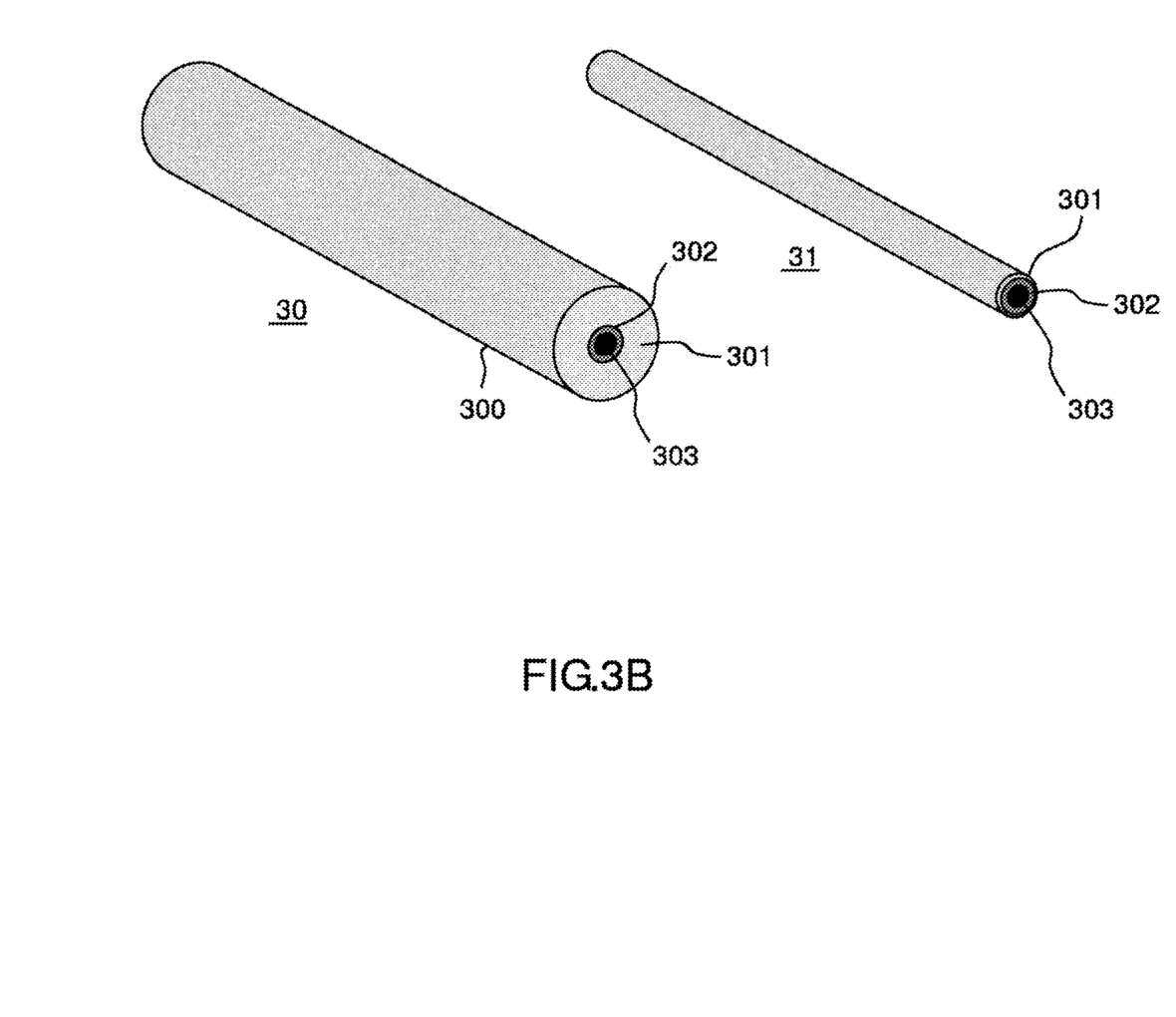

FIG. 3B schematically illustrates steps of a method for manufacturing said millimetric central longitudinal bars 321.

In a step 30, preforms 300 are manufactured, for example by an MCVD method (MCVD being the abbreviation for "Modified Chemical Vapor Deposition"). The preforms have an index profile and a desired doping.

To produce the desired index profile, the MCVD method consists in successively depositing layers of glass of controlled composition on the inner surface of a tube of substrate silica, the composition of the layers conditioning the index thereof. For the incorporation of optically active ions such as rare earth ions, the solution-doping of porous glass layers method can be implemented.

The preforms 300 produced by MCVD comprise, within a silica shell 301 for example, a central longitudinal portion 303 comprising the material of index $n_2$, for example a bar of glass, possibly doped by active ions, associated with aluminum, germanium or phosphorus ions, and a peripheral longitudinal portion 302 surrounding the central longitudinal portion and comprising the material of index $n_1$, for example a glass of refractive index $n_1$ less than $n_2$, but greater than that of the silica, obtained by a lower doping level than for the central longitudinal portion of, for example, aluminum, germanium or phosphorus.

The preforms can then be machined (step 31), for example chemically or mechanically (by abrasion) so as to partially or totally eliminate the silica shell 301.

Once machined, the preforms can be drawn into multiple millimetric bars having a diameter identical to that of the bars used to form the cladding and with which they will be assembled.

According to other exemplary embodiments, the central longitudinal bars can be produced by methods such as the OVD ("Outside Vapor Deposition") method, the Repusil method or even the Sol-Gel method. These methods do not necessarily necessitate total or partial chemical or etching.

The method described above, because it relies on the production of a microstructured core obtained by assembly, makes it possible to better control the general geometry of the core, in particular the arrangement of the doped zones, by greatly reducing the sensitivity to the optical properties of the subelements forming the micro-structuring while making it possible to benefit from the individual properties of these subelements to optimize the amplification.

Figure 4A:
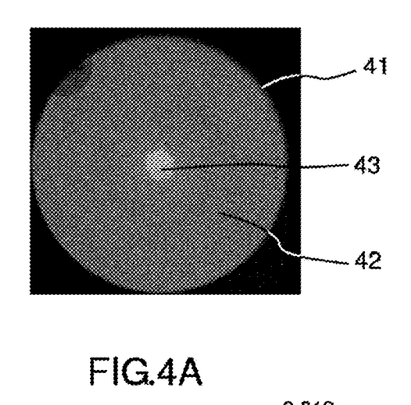
FIGS. 4A and 4B, images obtained by optical microscopy and scanning electronic microscopy of an example of few-mode amplifying fiber according to the present description.
Figure 4B:
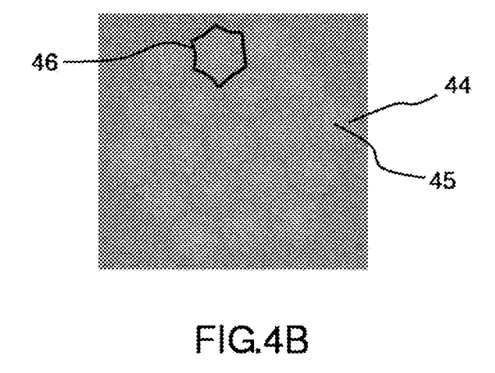
Figure 4C:
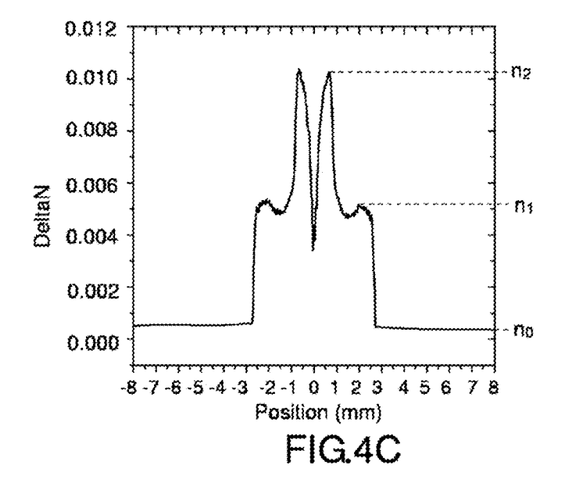
FIG. 4C a graph representing the refractive index profile in a preform used to form the fiber as illustrated in FIG. 4B.

FIG. 4A and FIG. 4B respectively represent images, obtained by optical and electronic microscopy, of an example of few-mode amplifying fiber 41 according to the present description, obtained according to the manufacturing method previously described. FIG. 4C illustrates the index profile of an MCVD preform used to manufacture the fiber represented in FIGS. 4A and 4B.

For the manufacturing of a few-mode optical fiber, the following materials were used: germanium for the pedestal and a germanium-aluminum-erbium mixture for the inclusions.

Thus, the parameters of the few-mode amplifying fiber produced are:

$n_1 - n_0 = 4.4*10^{-3} \pm 0.1*10^{-3}$
$n_2 - n_1 = 4*10^{-3} \pm 0.1*10^{-2}$
$d_1 = 6 \ \mu m \pm 0.1 \ \mu m$
$d_2 = 2.6 \ \mu m \pm 0.1 \ \mu m$

In this example, all the inclusions are doped with erbium ($Er^{3+}$) and aluminum ($Al^{3+}$) ions, all the inclusions being identical.

In FIG. 4A, the core 43 and the cladding 42 of the fiber 41 is thus observed.

In FIG. 4B, the inclusions 45 within the first material 44 can be seen. In this image, the presence of silica 46 is observed around the central bars, the silica shell around the preform not having been completely abraded.

FIG. 4C represents the experimental measurement of the refractive index profile of a preform adapted to form a millimetric central longitudinal bar (321, FIG. 3A). This figure shows the "pedestal" structure with the refractive index $n_2$ of the central longitudinal portion comprising a material of higher refractive index to form an inclusion and the refractive index $n_1$ of the peripheral longitudinal portion surrounding the central longitudinal portion and comprising a material of lower refractive index. In this example, the longitudinal portion is erbium doped. It should be noted, in the present case, that the dopant ion doping does not substantially modify the refractive index. In this example, the abrupt index variation that is visible at the center of the central longitudinal portion results from a manufacturing artefact that can be taken up by an adaptation of the preform manufacturing method. The applicants have shown that such an index variation modifies the propagation of the light in the fiber little or not at all. The few-mode amplifying fiber is therefore also more robust to the manufacturing artefacts than the amplifying fibers of the prior art. That stems from the fact that i) the elements forming the core can be obtained from manufacturing techniques conventionally used for the production of conventional fibers and ii) the approach proposed here is less sensitive to the absolute control of the index profile and to the uniformity thereof, the light not resolving the individual structures forming the inclusions.

In this example, the fiber is configured for the propagation of ten modes in the spectral band of use, i.e. the band C.

Figure 5A:
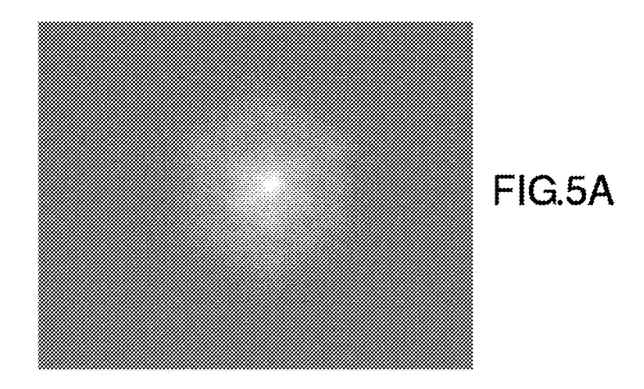
FIGS. 5A-5C, distributions of intensities observed at the output of an example of the few-mode amplifying fiber and recorded using an InGaAs camera.
Figure 5B:
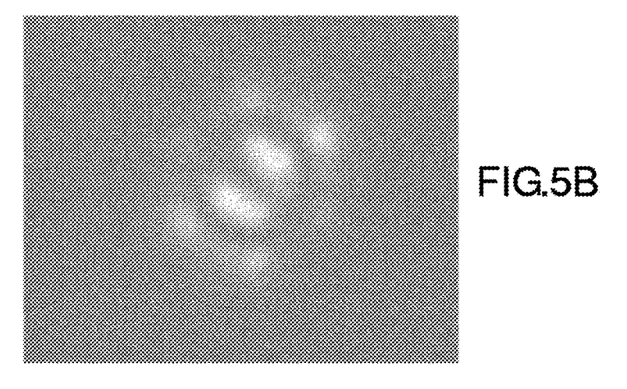
Figure 5C:
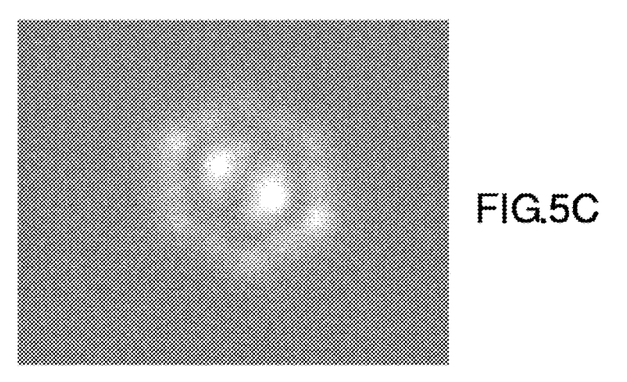

As an illustration, FIGS. 5A to 5C show distributions of intensities observed at the output of an example of the few-mode amplifying fiber and recorded using an InGaAs camera.

Figure 6:
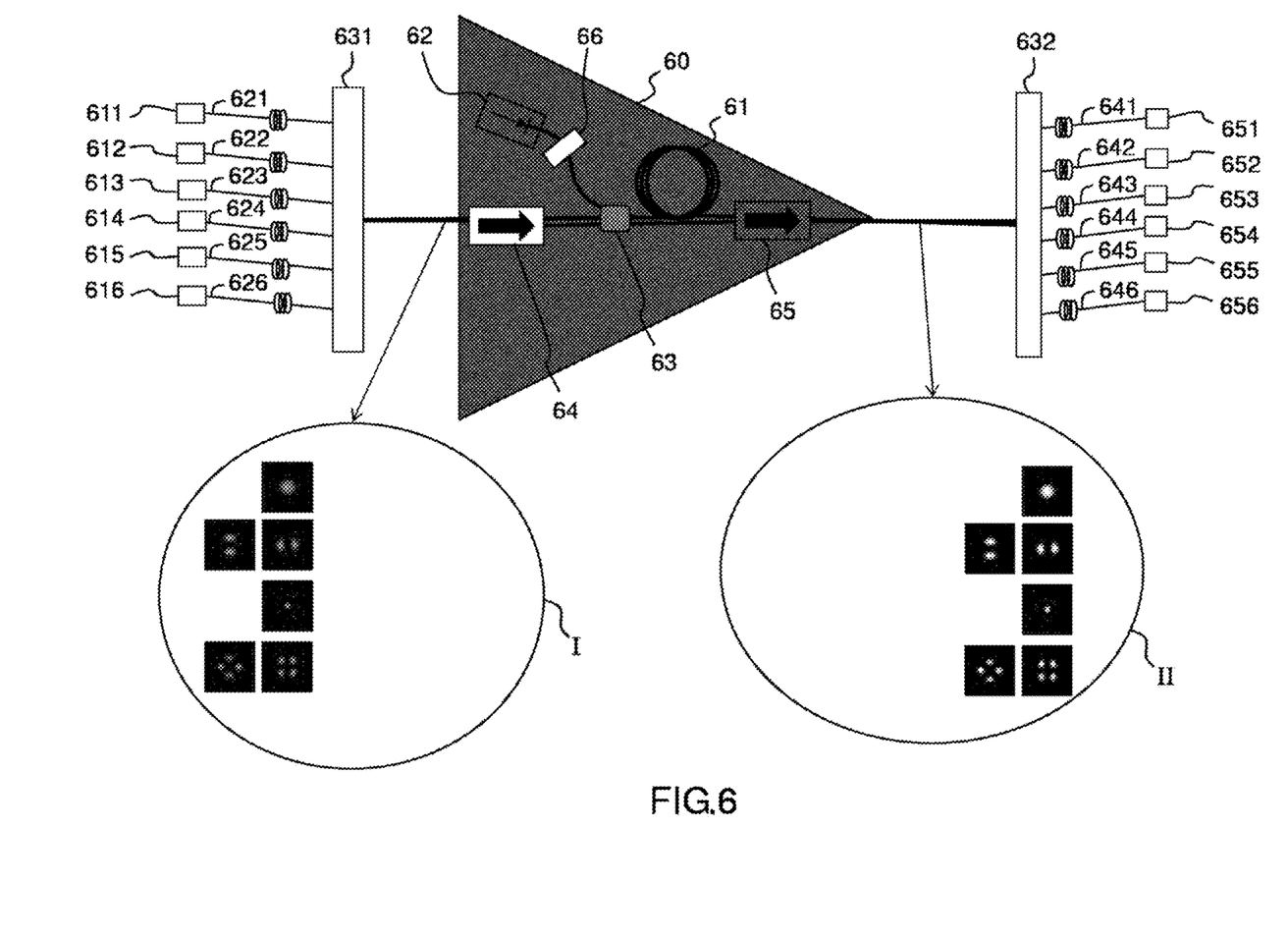
FIG. 6, a diagram of an example of amplification module comprising a few-mode amplifying fiber according to the present description.

FIG. 6 represents an example of an optical signal amplification module 60 according to the present description, equipped with a few-mode amplifying fiber 70 according to the present description. The few-mode amplifying fiber 70 is configured for the propagation of a given number of spatial modes.

The amplification module 60 is represented in this example in an optical telecommunications application applied to the amplification of signals from single-mode fibers.

Thus, a set of optical signals are transmitted by optical sources referenced 611-616 in FIG. 6 at wavelengths lying within the spectral band of use of the amplifying fiber 61 and transported by single-mode fibers referenced 621-626. A first incident optical signal spatial forming and multiplexing component 631 makes it possible to transform the intensity distribution of each of the incident optical signals in such a way that an incident optical signal corresponds to a spatial mode of the fiber 61, then to send the set of the signals into the fiber at the core of the amplification module 60. At the output of the amplification module 60, in the bubble referenced II, the six spatial modes corresponding to the six optical signals are once again observed, but amplified. The signals are demultiplexed and their intensity distribution is transformed by means of an incident optical signal demultiplexing and spatial forming component 632; they are then sent into as many single-mode optical fibers 641-646 detected at the other end of the optical telecommunication system by a set of detectors 651-656.

As illustrated in FIG. 6, the amplification module 60 comprises, in addition to the few-mode optical fiber 61, an optical pumping source 62 and a multiplexing component 63 configured to inject the optical signals and the pump beam into the amplifying fiber 61.

Once injected, the optical signals and the pump beam are propagated in the core of the amplifying fiber according to the invention. The optical pumping source is, for example, a single-mode laser diode transmitting around 980 nm and adapted for the transmission of a pump beam making it possible to "activate" the amplifying fiber 61. More specifically, the pump beam in the amplifying fiber makes it possible to excite the ions of the doped zones from the fundamental state to an excited state. The photons of the incident optical signals bring about a relaxation of excited ions to the fundamental state by a stimulated transmission mechanism which is accompanied by the transmission of photons of the same characteristics as those of the optical signals, resulting in an amplification of the incident signals.

In the example of FIG. 6, the amplification module further comprises a pump beam spatial forming device 66, configured to control the gain between the different spatial modes, that is to say the differential modal gain, or "DMG". The intensity of the pump beam is configured as a function of the doping profile in the amplifying fiber 61 and will be described in more detail hereinbelow.

The wavelength multiplexing component 63 makes it possible to inject the incident optical signals and the pump beam into the amplifying fiber. The multiplexing component is, for example, a dichroic mirror or any reflecting optical element that makes it possible to reflect a beam at a wavelength (that of the pump for example) and to transmit a beam at a different wavelength (that of the signals for example). Any other device, fiber-based or in free optic form, making it possible to perform a similar operation can be envisaged.

All along the few-mode amplifying fiber, the reflections and the Rayleigh scattering can also induce noise. In order to avoid this phenomenon, two optical isolators 64, 65 can be placed in the amplification module, on either side of the few-mode optical fiber 61, to limit the impact of these stray reflections.

Figure 7:
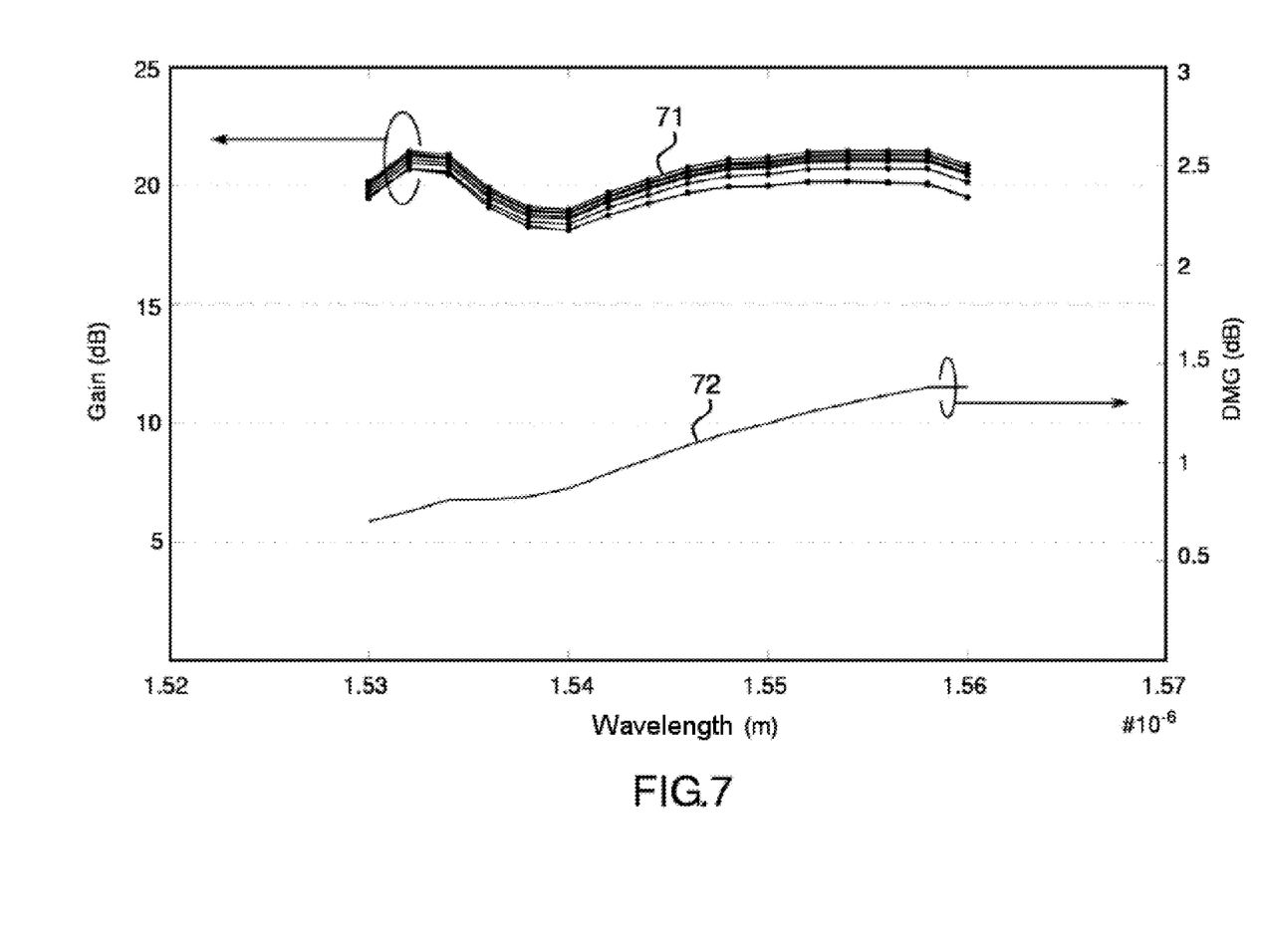
FIG. 7, a graph representing the theoretical gain of different modes and the gain deviation of the different modes in an example of few-mode amplifying fiber according to the present description, as a function of the wavelength.

FIG. 7 represents the gains calculated (curves 71) for different spatial modes of the few-mode optical fiber and for different wavelengths, as well as the gain deviation between the different spatial modes (DMG) (curve 72).

These results are obtained with a pump power of 800 mW distributed over the four spatial modes for respectively 23%, 36%, 28% and 14% of the total power, a total signal power of 3.2 W (20 µW per mode and per wavelength) and a fiber length of 1.9 m for a concentration of $Er^{3+}$ ions in each inclusion of $1*10^{26}$ ions·m$^{-3}$.

In this example, the index profile of the amplifying fiber, the distribution of dopant ions and the pump beam have been configured to minimize the deviation between the gains of the different modes over a spectral band of use lying between 1.53 µm and 1.56 µm and corresponding to the optical telecommunications band C. The DMG shows a deviation lying between 0.8 and 1.3 dB, which illustrates the equalization of the gain as a function of the different modes over the range of wavelengths considered.

Depending on the applications sought, the person skilled in the art will be able to design a few-mode amplifying fiber (refractive index profile and transverse dopant profile) and configure the pump beam to obtain the desired gains for the spatial mode or modes suitable for propagation in the fiber according to which the incident beams will be propagated.

Figure 8:
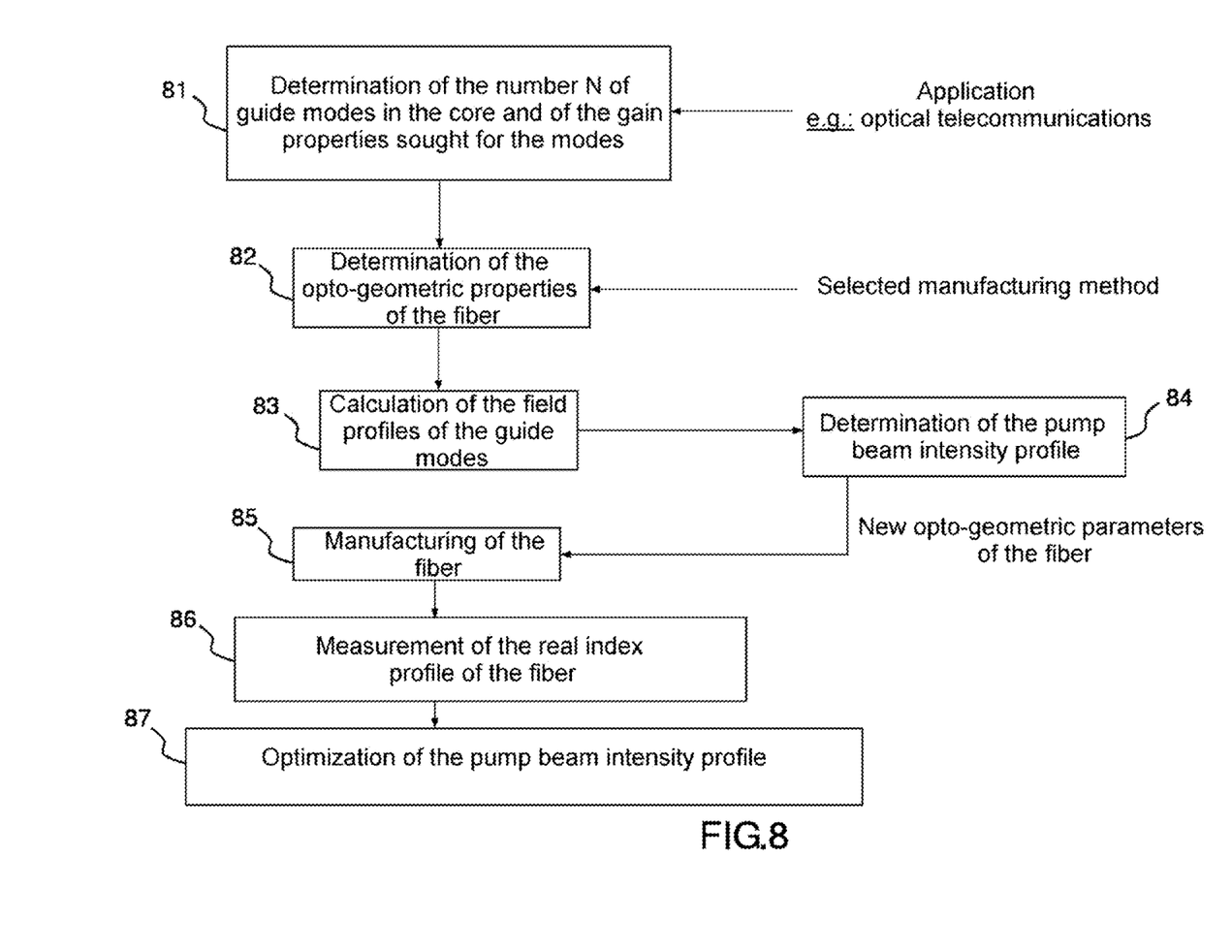
FIG. 8, a diagram representing steps for the design of an amplification module for the amplification of N optical signals according to the present description.

FIG. 8 thus illustrates different steps for the design of a few-mode amplifying fiber according to the present description and the configuration of the pump beam.

A first step 81 comprises the determination of a given number N of spatial modes having to be guided by the few-mode amplifying fiber at a wavelength of interest and, from among these modes, those that are wanted to be amplified.

The determination of the spatial modes and the amplification thereof depends on the application. Thus, for example, in the case of applications for optical telecommunications, one objective is to simultaneously amplify different incident signals being propagated in a given spectral band of use, with a gain difference between these modes that is as small as possible. The aim will then be to form at least as many guided modes in the few-mode amplifying fiber and to equalize the gains between these modes. For applications to the generation of fiber-based lasers, (used for applications in the medical field or, in the industrial world, for material forming activities), one objective is to control the amplification of the different guided modes so as to promote one mode over others.

In a second step 82, the opto-geometric properties of the core and of the inclusions are calculated to obtain the N modes in this spectral band of use. The opto-geometric properties depend also on the technology chosen for the production of the amplifying fiber. In this step, the number of inclusions is in particular determined, as is the "pedestal" core index profile, so as to allow in particular (i) the guiding of the desired number of modes at a wavelength representative of the spectral window of use and (ii) the containment of the light in the core and not in the individual inclusions.

From these parameters, the field profiles of the guided modes at the wavelength of the optical signals and at that of the pump are calculated (step 83).

There then comes a step 84 of determination of the intensity profile of the pump beam and of the distribution of dopant ions that is most favorable to the desired amplifying properties.

The use of a computation code, for example that referred to by Le Cocq et al, Optics Express 20(24) 27051 (2012) based on a coupled differential equation resolution model describing spatial evolution of the beams, makes it possible to calculate the gain of the different guided modes (determined previously) as a function of the conditions of use of the fiber (concentration of active ions, fiber length, pumping wavelength, optical powers for the pump and signal beams, etc.) is used to define the pump intensity profile which will make it possible to optimize the amplifying properties (for example, minimize the gain differential between modes). In practice, this optimization is done according to the two axes: the modal composition at the pump wavelength and the transverse dopant distribution. For that, the person skilled in the art will be able to use digital optimization methods (such as the gradient method) which will be coupled to the amplification module.

An amplifying fiber is manufactured (step 85) so as to respect the geometry deriving from the preceding theoretical optimization.

The index profile of the duly manufactured fiber, as well as the concentration of active ions, are measured and introduced into the mode computation code and the amplification code in order to compare theory and experience and refine the choice of the intensity profile of the pump beam (step 87).

The few-mode amplifying fiber has been described in the present description with a single core. It is also possible to design a multicore amplifying fiber in which each core would be produced according to the present description.

Although described through a certain number of detailed exemplary embodiments, a few-mode amplifying fiber, the method for manufacturing such a few-mode amplifying fiber and an amplification module comprising such a few-mode amplifying fiber according to the present description comprise different variants, modifications and refinements which will obviously become apparent to the person skilled in the art, it being understood that these different variants, modifications and refinements form part of the scope of the object of the present description, as defined by the following claims.

The invention claimed is:

1. A few-mode amplifying fiber in a given spectral band of use comprising:
    a cladding having a given refractive index ($n_0$); and
    at least one core of refractive index and of dimensions suited to the propagation of a finite number of spatial modes in the spectral band of use of the fiber, a spatial propagation mode corresponding to a channel for transporting information;

wherein the core comprises:
- a first solid material having a given first refractive index ($n_1$) strictly greater than the refractive index of the cladding ($n_0$), and
- within said first material, inclusions spatially separated from one another, formed by longitudinal bars each comprising at least one second solid material having a second refractive index ($n_2$) strictly greater than the first refractive index ($n_1$), at least one of said inclusions being actively doped.

2. The amplifying fiber as claimed in claim 1, wherein a normalized frequency parameter of each inclusion defined by, in which $n_1$ is said first refractive index, $n_2$ is said second refractive index, $d_2$ is a maximum dimension of said inclusion, is strictly less than 1.

3. The amplifying fiber as claimed in claim 1, wherein the difference between the second refractive index ($n_2$) and the first refractive index ($n_1$) is greater than or equal to $10^{-3}$.

4. The amplifying fiber as claimed in claim 1, wherein a maximum dimension ($d_2$) of each inclusion is less than or equal to ten times the minimum wavelength of said spectral band of use.

5. The amplifying fiber as claimed in claim 1, wherein the inclusions are distributed symmetrically with respect to a central axis of the amplifying fiber.

6. The amplifying fiber as claimed in claim 1, wherein at least one of said inclusions is doped with rare earth ions.

7. A method for manufacturing a few-mode amplifying fiber as claimed in claim 1, the method comprising:
- assembling millimetric peripheral longitudinal bars intended to form at least a part of the cladding around millimetric central longitudinal bars intended to form the core of the amplifying fiber, said central longitudinal bars comprising:
  - a central longitudinal portion comprising said second material, and
  - a peripheral longitudinal portion surrounding said central longitudinal portion and comprising said first material, the central longitudinal portion of at least one of the central longitudinal bars being actively doped; and
- drawing the duly formed assembly of said millimetric central longitudinal bars and of said millimetric peripheral longitudinal bars to form the amplifying fiber.

8. The method for manufacturing an amplifying fiber as claimed in claim 7, further comprising a preliminary step of manufacturing said millimetric central longitudinal bars, said preliminary step comprising:
- producing preforms, the preforms comprising a silica shell, said first and second materials;
- machining the preforms to partially or totally eliminate the silica shell; and
- drawing the preforms after machining to obtain said millimetric central longitudinal bars.

9. An amplification module for optical signals of wavelengths lying within a given spectral band of use, the amplification module comprising:
- a few-mode amplifying fiber as claimed in claim 1 configured to guide a given number of spatial modes in said spectral band of use;
- an optical pumping source configured to emit a pump beam that makes it possible to activate the amplifying fiber; and
- a wavelength multiplexing component configured to inject said optical signals and said pump beam into the amplifying fiber.

10. The amplification module as claimed in claim 9, further comprising a pump beam spatial forming module configured to selectively control the activation of the amplifying fiber as a function of said spatial modes.

11. The amplification module as claimed in claim 9, wherein the doping of at least one of said inclusions of the amplifying fiber and the spatial form of the pump beam are configured for the gains of the spatial modes to be equal.

12. The amplification module as claimed in claim 9, wherein the doping of at least one of said inclusions of the amplifying fiber and the spatial form of the pump beam are configured for the gain of a spatial mode of the amplifying fiber to be different from zero and for the gains of the other spatial modes to be nil.

* * * * *